June 6, 1933.  F. SCHLAYER  1,913,172
AUTOMATIC FEED DEVICE FOR THRESHING MACHINES
Original Filed Feb. 23, 1929
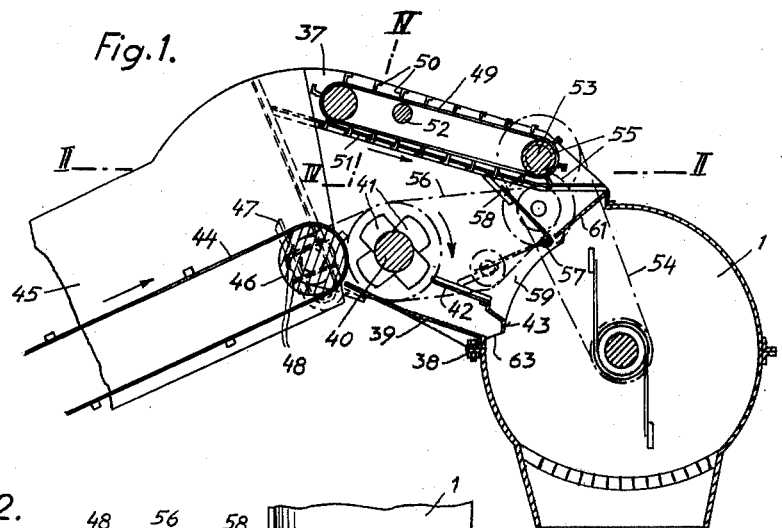
Fig. 1.
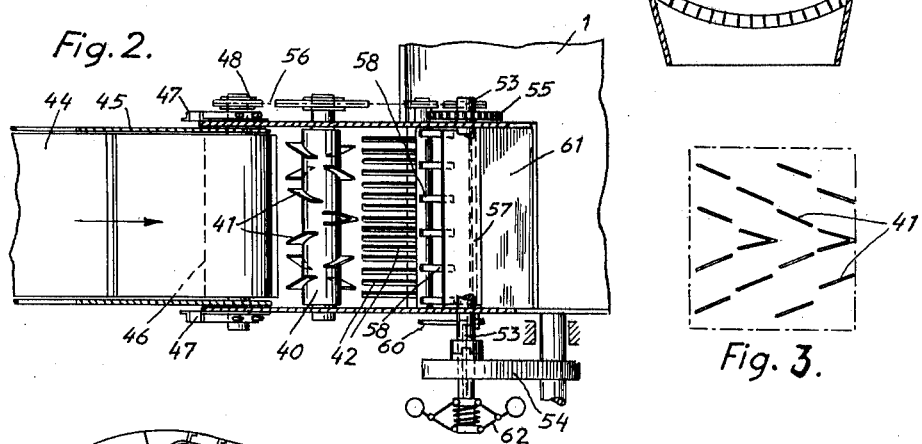
Fig. 2.
Fig. 3.
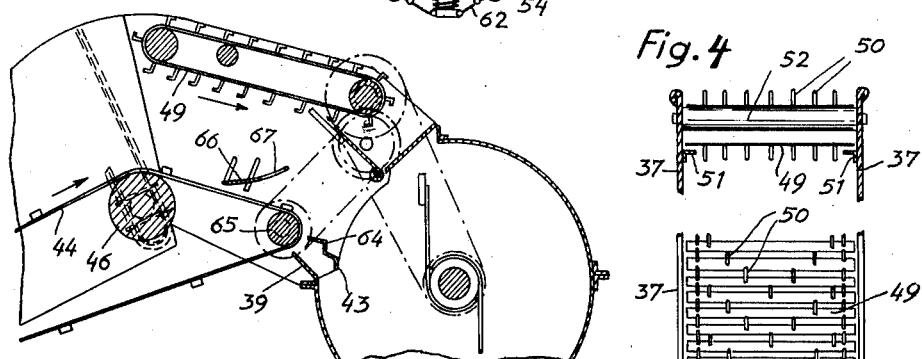
Fig. 6.
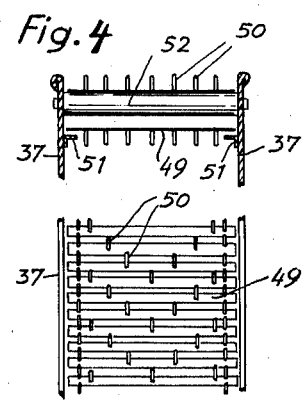
Fig. 4.
Fig. 5.
INVENTOR:
Felix Schlayer
by Chas H Keel
atty Patented June 6, 1933

1,913,172

UNITED STATES PATENT OFFICE

FELIX SCHLAYER, OF MADRID, SPAIN

AUTOMATIC FEED DEVICE FOR THRESHING MACHINES

Original application filed February 23, 1929, Serial No. 342,175, and in Austria February 20, 1928. Divided and this application filed May 1, 1930. Serial No. 448,867.

The present invention relates to a box-like automatic feed device for threshing machines, wherein the conveying device in the top portion consists of a rapidly moved endless band provided with fingers arranged like arrows and adapted to tear the threshing material during its passage in lateral direction. This conveying device cooperates preferably with a conveying device such as a roller disposed in the bottom portion of the feed box and adapted to retard the threshing material relative to the conveying tendency of the high speed band, the retarding device being provided with means adapted to lift the threshing material and to tear it apart also in lateral direction.

The invention affords the advantage of distributing the grain in a very fine manner and of insuring thereby the perfectly uniform feed of the threshing material to the machine which can thus be operated continually at uniform speed. This preserves both the threshing and the driving machines and insures uniform air supply for the grain cleaning devices driven by the threshing machine.

Two embodiments of the invention are illustrated in the accompanying drawing, in which Figure 1 is a longitudinal section of the automatic feed device of the first modification; Fig. 2, a section on the line II—II, of Fig. 1; Fig. 3, a view of the development of the vane roller; Fig. 4, a partial section on the line IV—IV, Fig. 1; Fig. 5, a partial top view of Fig. 1; and Fig. 6, a longitudinal section of the automatic feed device of the second modification.

The automatic feed device consists of a box 37 which is made of angle and sheet iron and which is placed in front of the inlet opening of the threshing machine e. g. of an axial threshing machine 1 and is secured in a suitable manner for example, by means of screws 38. The bottom 39 of the box is relatively short and slopes towards the threshing machine. On its front end there is mounted a slowly running roller 40 which has on its circumference two intermixed sets of obliquely placed vanes 41, which diverge at an angle, see Fig. 3. Behind the vane roller there is located a grate-like table 42, the rear end of which is continued as a nose 43 which is offset in the form of a step and projects into the drum of the threshing machine.

In the front of the vane roller 40 there terminates the feed conveyor consisting of an endless belt 44 which is kept in a frame 45. The upper belt pulley 46 is adjustable in an approximately vertical direction in a U-shaped bearing 47 of the front wall of the box. Three bearing positions are provided. In the example shown the belt pulley is located in the middle bearing position. Bolts 48 serve as adjusting members for the bearings. The velocity of the conveying belt 44 exceeds the peripheral velocity of the upper edge of the vanes 41.

On the cover of the box 37 there is located a very rapidly running endless belt 49 which is composed of parallel metal strips and which protrudes forward considerably beyond the vane roller 40. The belt has fingers 50 arranged arrow-wise, the arrow tips entering the arrow openings in front of them. The stiffening angle pieces 51 situated in the upper part of the side wall of the box are arranged on the inside of the wall. They fulfil the function of acting as holding members for the belt 49 if the latter should tear. 52 denotes a stretching wheel. A toothed wheel of the shaft 53, which is set in action by the drive 54 from the threshing machine 1, meshes with a transmission gear 55 which drives the vane shaft 40 and the upper pulley 46 of the conveyor by means of a chain 56.

In the upper portion of the discharge end of the box chamber there is located a swingable finger-like rake 58 which is fixed on the axle 57 and which strips firmly adhering fed material from the belt 49 and carries it down the inlet opening of the threshing machine. The axle 57 is provided at one end with a handle 60 which is adapted to be fixed in position and after the liberation of which the rake falls into the broken line position and leads the material to be threshed between the rear shaft 53 and a rear-box closing wall 61. This possibility of closing is desirable for the purpose of preventing, if necessary, the entry of foreign bodies into the threshing machine.

Between the shaft 53 and the drive 54 there is interposed a centrifugal regulator 62 which stops the automatic feed device when the number of revolutions of the threshing machine diminishes too much. It is advisable to mount the vane roller so that it can be removed in order that it may be taken out when threshing tangled grain. In this case the table 42 is advantageously provided with an extension which reaches to about the proximity of the conveyor.

The feed apparatus operates as follows:

The velocities are so chosen that there is imparted to the feeding belt 44 by means of the drive 54 and the connected transmission gear, a certain velocity which is not attained by the upper edge of the rotating vanes 41, whilst the belt 49 runs with a considerably higher velocity.

If the feeding conveyor is in the middle position in front of the feed box 37, the upper part of the sheaves carried up by the belt 44 comes first in the contact with the belt 49 above it, the fingers 50 of which grip the upper layers of the sheaves and convey them to the machine and at the same time pull them apart laterally. On running forward further, the fed in material, which decreases downwardly, strikes the roller 40 the vanes 41 of which again lift it into the range of the fingers 50 and at the same time tear apart the lowest portion during the further conveyance of the sheaves to the threshing machine.

If the wheel 46 of the feeding conveyor occupies the lowest bearing position, the distance between it and the rapidly running belt 49 is greater. The sheaf will therefore come into contact simultaneously at least with the belt 49 and the roller 40 and will in addition strike against its lower half. This slowly running checking roller must consequently lift the sheaf repeatedly into the range of the fingers 50 with the result that it is drawn only slowly into the machine, when the members 41 and 50 again exert a laterally dissevering effect on the thick layer of materials.

In the uppermost bearing position of the feed conveyor the sheaves are mainly gripped only by the belt 49 or its fingers 50 and pulled apart laterally. The arrangement of the feed conveyor at different heights consequently effects, in conjunction with the slowly running distributing roller 40 and the rapidly moved conveying belt 49 a larger or smaller stemming of the material being fed in. This affords the possibility of automatically regulating the feed in accordance with the condition of the material to be threshed.

The angularly arranged members 41 and 50 pull the sheaves apart so thoroughly that there results an uninterrupted feed with a thin layer filling the whole width of the feed opening. The attendant need not pay any special attention to the machine but can throw onto the feed conveyor whole sheaves which are treated more rapidly or more slowly according to the setting of the feed conveyor. A rearing up of the sheaves on slowing down of velocity does not take place because they are previously caught by the belt 49 above them.

If it be desired to interrupt the feeding of material to the threshing machine—for example in the presence of foreign bodies, the lever 60 is released, whereupon the brake 58 drops down, bars the inlet opening 59 and allows the material to be fed to pass out behind the belt 49. The grains falling on the bottom 39 of the box pass through an opening 63, provided beneath the nose 43, into the threshing machine.

In the modified form shown in Fig. 6 the vane roller is omitted. The conveyor belt 44 extends directly to the step 64 of the nose 43, the bottom 39 of the box being accordingly shorter, said bottom serving again to catch the grains dropping off at the point where the belt reverses its direction and to conduct them to the threshing chamber. Approximately at the middle between the belt rollers 46, 65 and parallel to the same a plate 66 is arranged just above the ledges of the belt 44. Said plate is inclined to the direction of movement and eventually adjustable in vertical direction. Fingers 67 curved in upward direction being arranged at the rear edge of this plate and spaced at short distances. These fingers which may be resilient cooperate with the upper belt 49 and serve to retain the arriving sheaves for better distribution.

The above described feed device can also be used with other kinds of longitudinal threshing machines with or without a winnowing device.

What I claim is:

1. An automatic feed device for threshing machines, comprising a main conveying device and an auxiliary conveying device arranged above the discharge end of the said main conveying device, the said auxiliary conveying device having an endless band with fingers thereon arranged in rows disposed at an angle to the direction of motion of the band, the rows meeting at angles whose apices extend in the direction of motion of the band, said fingers being displaced at smaller distances from each other in the rows than the distance between the successively arranged rows, and means for driving the lower run of the endless band at a greater speed than the main conveyor.

2. An automatic feed device as specified in claim 1, in which the apices of the angles lie substantially on the vertical central plane of the conveying band and between sides of the succeeding row angles.

3. An automatic feed device for threshing machines, comprising a main conveying device and an auxiliary conveying device arranged above the discharge end of the said main conveying device, the said auxiliary conveying device having an endless band, means for driving the lower run of the endless band at a greater speed than the main conveyor, the endless band having fingers arranged in rows disposed obliquely to the direction of motion of the band, the rows being made up into angles which extend opposite to the direction of motion of the band, a roller being arranged behind the main conveying device and at a certain distance below the auxiliary conveying device, the said roller having in circumferential direction single vanes disposed one behind the other and extending helically from the center of the roller towards its ends while forming angles oblique to the direction of motion.

4. An automatic feed device for threshing machines, comprising a main conveying device and an auxiliary conveying device arranged above the discharge end of the said main conveying device, the said auxiliary conveying device having an endless band, means for driving the lower run of the endless band at a greater speed than the main conveyor, the endless band having fingers arranged in rows disposed obliquely to the direction of motion of the band, the rows being made up into angles which extend opposite to the direction of motion of the band, the main conveying device containing an endless band and above the discharge end of the band and below the auxiliary conveyor a plate being mounted obliquely ascending in the direction of motion of the band.

5. An automatic feed device for threshing machines, comprising a main conveying device and an auxiliary conveying device arranged above the discharge end of the said main conveying device, the said auxiliary conveying device having an endless band, means for driving the lower run of the endless band at a greater speed than the main conveyor, the endless band having fingers arranged in rows disposed obliquely to the direction of motion of the band, the rows being made up into angles which extend opposite to the direction of motion of the band, the main conveying device containing an endless band and above the discharge end of the band, at a certain distance below the upper auxiliary conveying device, a plate member being mounted ascending obliquely in the direction of motion of the threshing material, the said plate being adjustable relative to the auxiliary conveying device.

6. An automatic feed device for threshing machines, comprising a main conveying device and an auxiliary conveying device arranged above the discharge end of the said main conveying device, a feed box, the said auxiliary conveying device having an endless band, means for driving the lower run of the endless band at a greater speed than the main conveyor, the endless band having fingers arranged in rows disposed obliquely to the direction of motion of the band, the rows being made up into angles which extend opposite to the direction of motion of the band, the rolls of the single endless band of the auxiliary conveying device being disposed in the wall of the feed box and their drive being located on the outside of the box, and stiffening members being fastened to the inside of the box walls containing the endless band and adapted to brace the walls of the box and to serve as holding device for the band in case of a fracture of the latter.

7. An automatic feed device for threshing machines, comprising in its top portion a high speed conveying device, said device consisting of an endless band, means on said band for tearing the threshing material during the conveying, an auxiliary outlet being arranged between the end of the conveying device and the admission opening of the threshing machine, a rake oscillatably mounted under said auxiliary outlet adapted to be secured in the upper position to strip the sheaves off the conveying device and in the lower position to shut off the supply of sheaves to the drum and to deflect it towards the auxiliary outlet.

8. An automatic feed device for threshing machines comprising a main conveying device and an auxiliary conveying device arranged above the discharge end of the main conveying device, the said auxiliary conveying device comprising an endless band of closely spaced flexibly joined transverse bars with fingers thereon, said fingers being staggered on successive bars to form groups of oppositely and rearwardly inclined rows of fingers on the two sides of the band with the spacing such that there is no appreciable overlapping of the rear and front ends of succeeding rows of a group.

9. An automatic feed device of the character set forth in claim 8 wherein successive bars have unequal numbers of fingers which are unequally spaced in different bars.

10. An automatic feed device for threshing machines comprising a main conveying device and an auxiliary conveying device arranged above the discharge end of the main conveying device, the said auxiliary conveying device comprising an endless flexible band with conveying fingers thereon, said fingers being arranged in two groups of longitudinally spaced rows disposed on the opposite sides of the band and the rows of the two groups being oppositely and rearwardly inclined with the spacing such that there is no appreciable overlapping of the rear and front ends of succeeding rows of a group whereby the material is spread laterally and outwardly during conveyance.

In testimony whereof, I have signed my name to this specification.

FELIX SCHLAYER.